United States Patent
Delbruck et al.

(10) Patent No.: US 9,631,974 B2
(45) Date of Patent: Apr. 25, 2017

(54) PHOTOARRAY, PARTICULARLY FOR COMBINING SAMPLED BRIGHTNESS SENSING WITH ASYNCHRONOUS DETECTION OF TIME-DEPENDENT IMAGE DATA

(71) Applicant: UNIVERSITAT ZURICH, Zurich (CH)

(72) Inventors: Tobias Delbruck, Zurich (CH); Raphael Berner, Plan-les-Ouates (CH)

(73) Assignee: UNIVERSITÄT ZÜRICH, Zurich (CH)

( * ) Notice: Subject to any disclaimer, the term of this patent is extended or adjusted under 35 U.S.C. 154(b) by 0 days.

(21) Appl. No.: 14/366,128

(22) PCT Filed: Dec. 19, 2012

(86) PCT No.: PCT/EP2012/076093
§ 371 (c)(1),
(2) Date: Jun. 17, 2014

(87) PCT Pub. No.: WO2013/092666
PCT Pub. Date: Jun. 27, 2013

(65) Prior Publication Data
US 2014/0326854 A1    Nov. 6, 2014

(30) Foreign Application Priority Data
Dec. 19, 2011 (EP) .................................... 11194387

(51) Int. Cl.
*G01J 1/44* (2006.01)
*H04N 5/378* (2011.01)
*G01J 1/02* (2006.01)

(52) U.S. Cl.
CPC ............... *G01J 1/44* (2013.01); *G01J 1/0238* (2013.01); *H04N 5/378* (2013.01); *G01J 2001/446* (2013.01); *G01J 2001/4473* (2013.01)

(58) Field of Classification Search
CPC ...... G01J 1/0238; G01J 1/44; G01J 2001/446; G01J 2001/4473; H04N 5/378
See application file for complete search history.

(56) References Cited

U.S. PATENT DOCUMENTS

| 6,253,161 B1 | 6/2001 | Arias-Estrada |
| 7,728,269 B2 | 6/2010 | Lichtsteiner |

(Continued)

FOREIGN PATENT DOCUMENTS

| JP | 2010-510732 | 4/2010 |
| KR | 2008-0009025 | 1/2008 |
| WO | 99/57605 | 11/1999 |

OTHER PUBLICATIONS

Mehdi Habib, "A low power smart CMOS image sensor for surveillance applications," Machine Vision and Image Processing (MVIP) 2010 6th Iranian IEEE, Oct. 27, 2010, pp. 1-4.

(Continued)

*Primary Examiner* — Francis M Legasse, Jr.
(74) *Attorney, Agent, or Firm* — JMB Davis Ben-David

(57) ABSTRACT

The invention relates to a photoarray (1), comprising: a plurality of cells (10), wherein each of said cells (10) comprises a means (20) that is configured to generate a photocurrent (I) being proportional to the intensity (L) of the light impinging on the respective cell (10), and wherein each of said cells (10) comprises a change detection circuit (100) connected to the respective means (20) for generating the photocurrent (I), which change detection circuit (100) is configured to generate an output signal merely in case a change event occurs at which said intensity (L) changes by (Continued)

a threshold amount (T, T') since the preceding change event from the respective cell (10). According to the invention said means (20) for generating said photocurrent (I) is additionally also used to estimate the magnitude of the said photocurrent (I) being a measure of the brightness of the light at the respective cell (10).

17 Claims, 6 Drawing Sheets

(56) References Cited

U.S. PATENT DOCUMENTS

| | | | |
|---|---|---|---|
| 7,791,664 B1 | 9/2010 | Koifman | |
| 9,036,065 B1* | 5/2015 | Vogelsang | H04N 5/378 |
| | | | 250/208.1 |
| 2003/0015647 A1 | 1/2003 | Guo | |
| 2005/0273661 A1 | 12/2005 | Brajovic | |
| 2008/0012973 A1* | 1/2008 | Park | H04N 5/335 |
| | | | 348/294 |
| 2010/0182468 A1 | 7/2010 | Posch et al. | |

OTHER PUBLICATIONS

Chi Y M et al: "CMOS Camera with In-Pixel Temporal Change Detection and ADC," IEEE Journal of Solid-State Circuits, IEEE Service Center, Piscataway, NJ, U.S.A., vol. 42, No. 10, Oct. 1, 2007, pp. 2187-2196.
Burgi P-Y et al: "A 128 x 128 Pixel 10-db dynamic-range vision-sensor clip for image contract and orientation," IEEE Journal of Solid-State Circuits, IEEE Service Center, Piscataway, NJ, U.S.A., vol. 38, No. 12, Dec. 1, 2003, pp. 2325-2333.
Johan Leijten et al: "Smart FPA's: are they worth the effort?" Proceedings of SPIE, vol. 6361, Jan. 1, 2006, pp. 636115-636115-9.
Eric R. Fossum "Active Pixel Sensors: Are CCD's Dinosaurs?" Proc SPIE 1900:2-14—Jul. 1993.
S. Decker, D. McGrath, K. Brehmer, and C. Sodini, "A 256x256 CMOS imaging array with wide dynamic range pixels and column-parallel digital output," IEEE J. Solid-State Circuits, vol. 33, No. 12, pp. 2081-2091, Dec. 1998.
S. Kavadias, B. Dierickx, D. Scheffer, A. Alaerts, D. Uwaerts, and J. Bogaerts, "A logarithmic response CMOS image sensor with on-chip calibration," IEEE J. Solid-State Circuits, vol. 35, No. 8, pp. 1146-1152, Aug. 2000.
B. Choubey, S. Aoyoma, S. Otim, D. Joseph, and S. Collins, "An electronic calibration scheme for logarithmic CMOS pixels," IEEE Sensors J., vol. 6, No. 4, pp. 950-956, Aug. 2006.

* cited by examiner

PHOTOARRAY, PARTICULARLY FOR COMBINING SAMPLED BRIGHTNESS SENSING WITH ASYNCHRONOUS DETECTION OF TIME-DEPENDENT IMAGE DATA

CROSS REFERENCE TO RELATED APPLICATIONS

This is the U.S. National Stage of International Application No. PCT/EP2012/076093, filed Dec. 19, 2012, which was published in English under PCT Article 21(2), which in turn claims the benefit of European Patent Application No. 11194387.4 filed on Dec. 19, 2011.

The invention relates to a photoarray, i.e. an array of photosensitive elements, particularly for detecting time-dependent image data, according to the preamble of claim 1.

Such a photoarray usually comprises a plurality of cells (e.g. an array of cells), with each cell (also denoted as pixel) having a means (e.g. a photodiode or a phototransistor) for generating a signal (e.g. photocurrent) depending on a light intensity at the respective cell. The array of cells may be a topologically one- or two-dimensional array of cells, which may or may not have rectangular boundaries. Each cell further comprises a change detection circuit which may be configured as described in detail in U.S. Pat. No. 7,728,269 B2 (where the change detection circuit is particularly isolated by means of a voltage buffer from a photosensor circuit comprising said means for generating a photocurrent). Such a change detection circuit is configured to asynchronously emit change events that signal that the brightness has changed by a threshold amount since the last change event from the pixel (cell). Because these events particularly represent logarithmic intensity changes of the incoming light impinging on the respective cell, these events represent what is also referred to as a "temporal contrast".

Real time artificial vision using a photoarray, such as disclosed in US 2003/0015647, is traditionally limited to the frame rate at which the photoarray is sampled. To see fast changing things, a high frame rate has to be used, and then such photoarrays generate a huge amount of redundant data that needs powerful and costly post processing.

On the other hand, the technical teaching disclosed in U.S. Pat. No. 7,728,269 B2 being incorporated herein by reference enables vision sensors that react to scene reflectance changes with low latency and highly reduced redundancy. However, it is not suited for sensing a static scene.

The problem underlying the present invention is thus to provide for a photoarray that reduces the above stated disadvantage and is thus better suited for real time artificial vision.

This problem is solved by a photoarray having the features of claim 1.

According thereto, the respective means for generating said photocurrent (e.g. photoelement) is additionally also used to estimate the (particularly absolute) brightness at the respective cell (e.g. with a constant rate in contrast to the asynchronous change events). This brightness is proportional to the magnitude of the photocurrent at the respective cell.

Particularly, each cell is configured to asynchronously detect change events (e.g. via the respective change detection circuit) and to update the brightness at each change event between regular brightness samples sampled with said (e.g. comparatively low) constant rate.

Particularly, said change detection circuit of the photoarray according to the invention is configured to generate an output signal if (and only if) a change event occurs at which said light intensity at the respective cell changes (particularly at least) by a threshold amount since the preceding change event of the respective cell (also termed asynchronous detection), wherein said output signal is a so-called ON-signal when said intensity increases by a threshold amount and a so-called OFF-signal when said intensity decreases by a threshold amount.

Particularly, said photoarray comprises an encoder connected to said cells, which encoder is configured to determine the address (i.e. position of the respective cell within the array of cells) of the respective cell generating an output signal as well as whether said intensity increased (ON-signal) or decreased (OFF-signal) by said threshold amount. The corresponding address and output signal (ON or OFF) is fed as an event to a buffer that can be accessed by an external receiver as described in detail in U.S. Pat. No. 7,728,269 B2.

Thus, the photoarray according to the invention can generate ON and OFF events (output signals) from all of its cells (pixels), wherein the rate of these events depends on the rate of changes of the light signal (intensity). This allows a drastic reduction of the amount of data at its source, namely the individual cells (pixels), since data communication out of the photoarray merely occurs when the incoming light intensity changes.

At the same time said single photoelement (e.g. photodiode or phototransistor) of the respective cell is also used for determining the brightness at said cell (i.e. the magnitude of the photocurrent), so that due to the asynchronous event-based output of the change detection circuit achieving very high time resolution, the brightness can be read out at a relatively low sample rate and it is still possible to react to changes with a very low latency. This greatly reduces the amount of data to be processed compared to conventional cameras.

Particularly, said means for generating the photocurrent being proportional to the intensity of the incoming light impinging on the respective cell is formed by a photoelement, e.g., a photodiode or a phototransistor, wherein particularly each cell comprises merely a single photodiode or phototransistor (photoelement).

Further, as already stated above, the change detection circuit is particularly configured to generate an output signal if (and only if) a change event occurs at which said intensity changes (at least) by a threshold amount since the preceding change event from (of) the respective cell, wherein said output signal is an ON-Signal when said intensity increases by a threshold amount and an OFF-signal when said intensity decreases by a threshold amount. Accordingly, said input signal can be reconstructed by adding a given intensity (threshold amount) at each ON-event, i.e., at each occurrence of an ON-signal, while subtracting the same at each OFF-event, i.e., at each occurrence of an OFF-signal.

In order to be able to read a signal representing the brightness, i.e., the current magnitude of the photocurrent at the respective cell (pixel), the photoarray according to the invention particularly comprises a brightness readout circuit that is configured so as to allow for reading said signal.

In this regard, said brightness readout circuit is particularly connected to the drain of a (e.g. feedback) transistor, wherein the source of said transistor is connected to said means for generating the photocurrent, particularly to the n-region of a single photodiode whose p-region is particularly connected to the ground. Of course, one may also construct a complementary circuit by substituting n-devices with p-devices and vice versa. This holds for all circuits described in the present application.

A key feature of the implementation according to the invention is given by the fact that the photocurrent directly drives the brightness readout circuit, rather than being first copied. Copying small currents introduces large amounts of mismatch and is difficult for typically small photocurrents. The present invention therefore utilizes a feedback circuit and thus avoids making any copy of the photocurrent.

In this regard, the brightness value is monotonically related to the photocurrent (i.e. the photodiode signal), but it may be linearly or non-linearly related to the value of the photocurrent, i.e. in the case of a logarithmic pixel (cell), the brightness is logarithmically related to the photocurrent.

The change detection circuit asynchronously emits change events that signal that the brightness has changed by a threshold amount since the last change event from the respective pixel (cell). Particularly, these events represent logarithmic intensity changes. Therefore, these events represent what is hereafter also denoted as a "temporal contrast".

According to an aspect of the invention, the photoarray (i.e. the brightness readout circuit) is adapted to determine (or sample) the brightness at successive points in time with a constant or a variable rate, wherein particularly said rate is (particularly at least temporarily) smaller than an average rate of the change events, wherein particularly said rate lies between 0.1 Hz and 100 Hz, particularly between 1 Hz and 100 Hz, depending on the size of the array, the computational resources available for processing said brightness samples, and the desired ratio of said brightness samples compared with said change events.

Yet another aspect of the current invention is that the change events of the change detection circuit can be used to interpolate and extrapolate between the brightness. In this regard, the photoarray is particularly configured to estimate the brightness at the respective cell in between two of said successive points in time by adding to the brightness as sampled at the last point in time a respective threshold amount in case of an ON-event and by subtracting the threshold amount in case of an OFF-event. In this regard, the magnitude of the photocurrent being a measure for the brightness may also be represented by a voltage (see below). The added/subtracted thresholds are then also voltages.

For a more accurate extrapolation, the change detection circuit can be reset whenever the intensity (brightness) is read for this corresponding pixel (cell) on the regular basis, i.e., at the above mentioned points in time, which means that the change events code magnitude change since the last brightness sample.

In case only a coarse extrapolation of the brightness is sufficient, the change detection and the intensity (brightness) reading can be completely independent, i.e., the photoarray is then configured such that the change detection circuit is completely independent from the brightness readout circuit. In this case the change events code magnitude change since the last change event.

In order to read out the brightness of the respective cell (pixel) of the photoarray, said brightness readout circuit is particularly configured to integrate the photocurrent of the respective cell on a capacitance in order to determine the current magnitude of the photocurrent as a measure for the brightness at the respective cell, as it is done in conventional APS pixels (c.f. Eric R. Fossum, "Active Pixel Sensors: Are CCD's Dinosaurs?" Proc. SPIE Vol. 1900, Charge-Coupled Devices and Solid State Optical Sensors III, p. 2-14, 1993).

According to another possibility, the brightness readout circuit is configured to logarithmically convert the photocurrent of the respective cell into a voltage using one or several transistors in the subthreshold regime.

In both of the above-described approaches for reading out the brightness, the brightness information is contained in an analog voltage, which is then buffered, multiplexed out by conventional means, and converted to a digital value, in particular.

According to a third approach, the brightness readout circuit may integrate the photocurrent on a capacitance over a fixed voltage range; the brightness information is then contained in the time between start and end of the integration over the voltage range. This approach is used in the ATIS (C. Posch, (Bad Fischou, AT); M. Litzenberger, (Bruck an der Leitha, AT); D. Matolin, (Vienna, AT); R. Wohlgenannt, (Wien, AT), METHOD FOR THE GENERATION OF AN IMAGE IN ELECTRONIC FORM, PICTURE ELEMENT (PIXEL) FOR AN IMAGE SENSOR FOR THE GENERATION OF AN IMAGE AS WELL AS IMAGE SENSOR. US Patent Application 20100182468 filed Nov. 22, 2007), where the integration is triggered by the change event. However, in that implementation, a separate photodiode and readout circuit is used rather than the dual-use means (photodiode) for generating a photocurrent disclosed here.

In the following, further advantages and features of the present invention as well as embodiments of the present invention are described with reference to the Figures, wherein:

FIG. 1 schematically shows how the photocurrent of the single photodiode can be used for both change detection and magnitude readout (i.e. for driving a brightness readout circuit);

Figure 5:
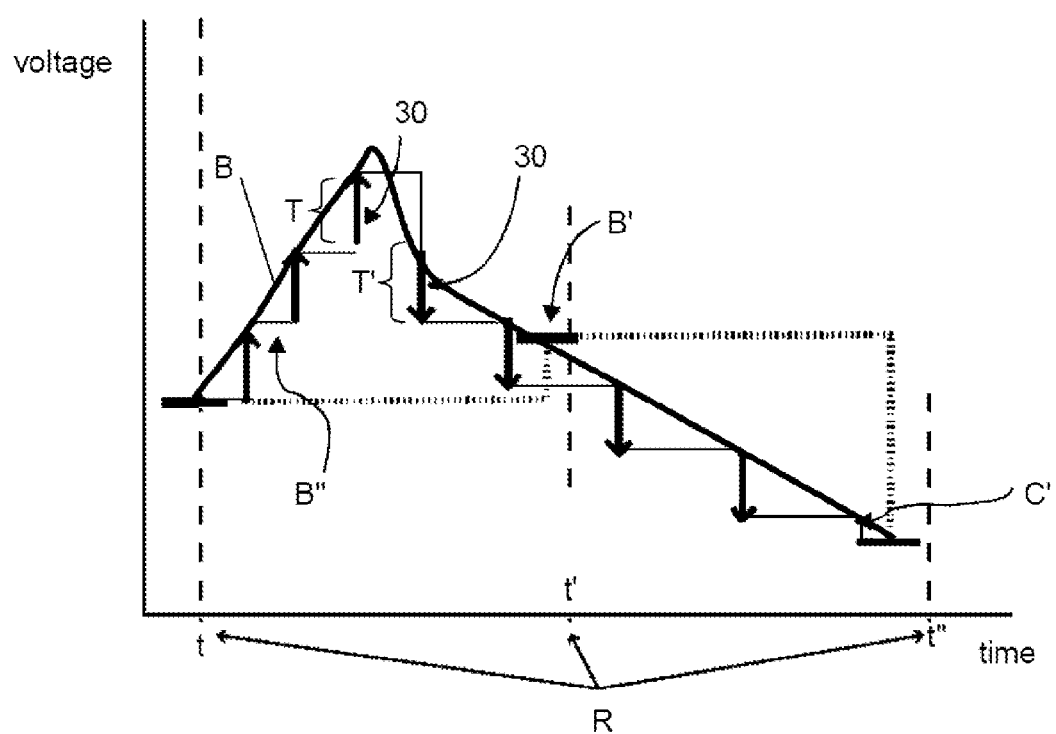
Figure 6:
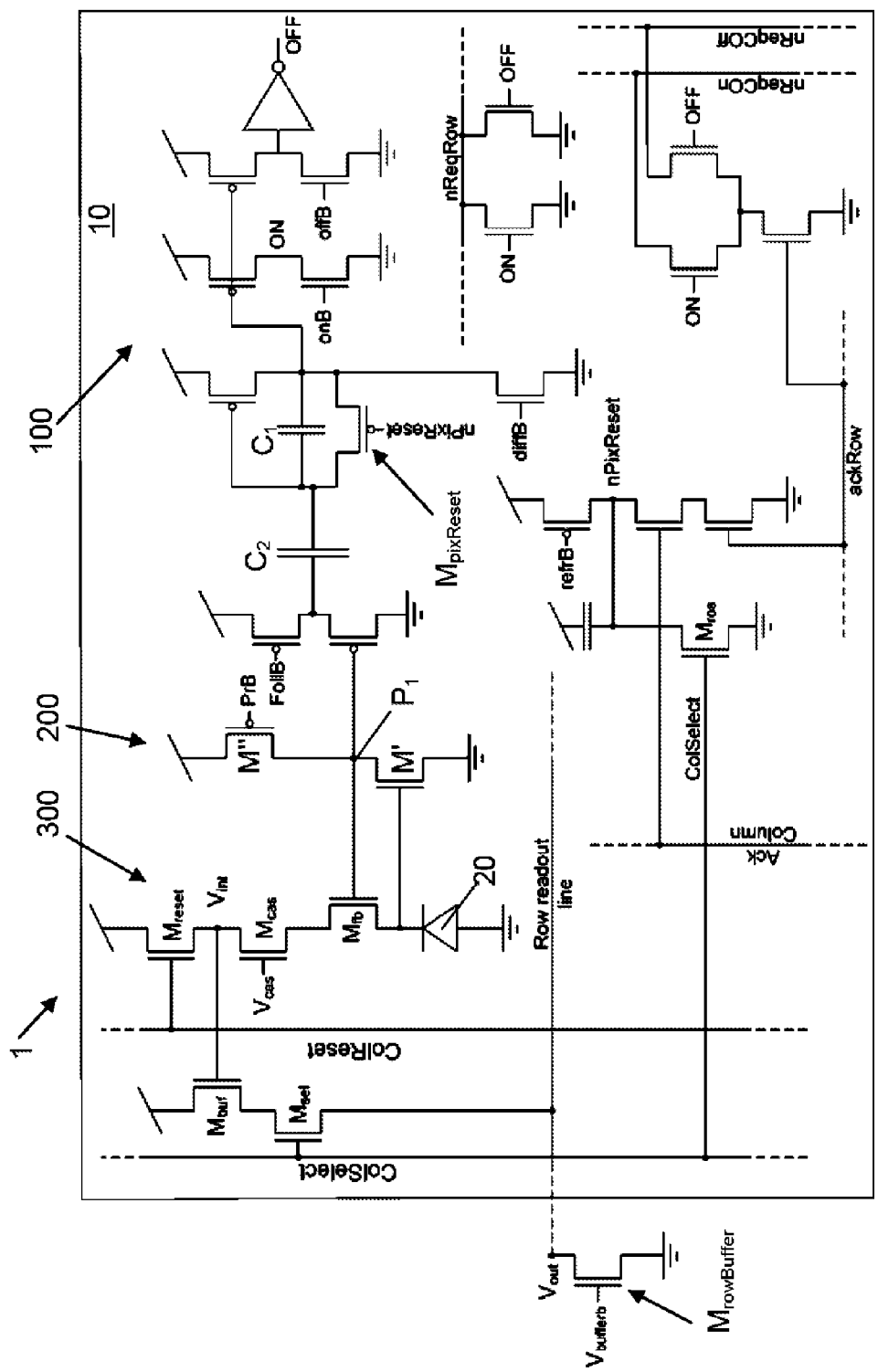

FIG. 5 illustrates the interpolation and extrapolation of brightness samples with temporal contrast change events between brightness samples; and FIG. 6 shows an embodiment of the complete combined change detection circuit and brightness readout circuit being adapted for integrating the photocurrent over a capacitance for determining the brightness at the respective cell of the photoarray according to the invention.

Figure 1:
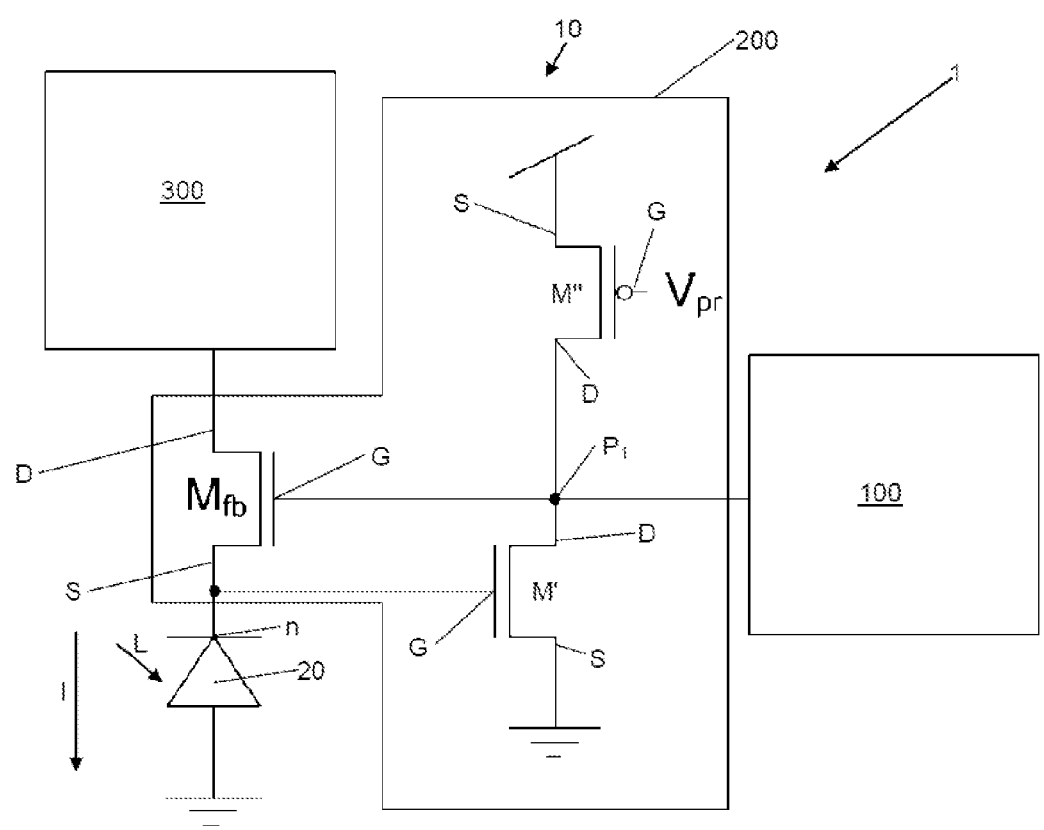

FIG. 1 shows a schematical illustration of a photoarray 1 according to the invention comprising a plurality of cells 10 (in FIG. 1 only one such cell (pixel) 10 is shown). The cells 10 are usually arranged in rows and columns forming a two-dimensional array.

Each such cell 10 comprises a photodiode (or a similar element) 20 for generating a light-dependent current (photocurrent) I, which photodiode 20 is part of a photosensor circuit 200, also denoted as DVS photosensor circuit (DVS for dynamic vision sensor). Particularly, the photodiode 20 generates a photocurrent I proportional to the incoming light intensity L.

The single photodiode 20 of each cell 10 is connected with its n-region to the source S of a (feedback) transistor $M_{fb}$ and with its p-region to the ground, which transistor $M_{fb}$ is in turn connected with its gate G via a node $P_1$ to a change detection circuit 100 as well as to the drain D of a further transistor M' being connected to the ground with its source S. The gate G of said further transistor M' is connected to the n-region of said photodiode 20 and to the source S of the feedback transistor $M_{fb}$. Node $P_1$ (i.e. the gate G of transistor $M_{fb}$ and Drain D of further transistor M') is further connected to the drain D of yet another transistor M''' (e.g. p-channel) having a gate G to which a voltage $V_{pr}$ may be applied being proportional to the logarithm of the sum of all photocurrents I through all cells 10 of the photoarray 1 allowing for a reduction of the overall power consumption of the photosensor circuit 200 at low intensities L.

The transistors M' and M''' of the photosensor circuit 200 form a part of an amplifier that may be configured to have a substantially logarithmic response, thus generating a sensor signal having a voltage V at node $P_1$ being of the form V=const+k*log(I), where I is the photocurrent and k and const are constant values.

In order to detect change events 30, at which the intensity L of the light impinging on the respective cell 10 changes by a threshold amount T, T' (c.f. also FIG. 5), each cell 10 further comprises a change detection circuit 100 being connected to said node $P_1$.

According to FIG. 6 such a change detection circuit 100 is configured to generate two output signals ON and OFF, wherein the signal ON is generated when the voltage over a first capacitor $C_1$ exceeds a pre-defined positive threshold value (amount) T, whereas the OFF-signal is generated when the voltage over said first capacitor $C_1$ drops below a pre-defined negative threshold value (amount) T'. The circuit 100 can be reset by feeding a reset signal nPixReset to the transistor switch MpixReset.

The DVS pixel (i.e. the photosensor circuit 200 and the change detection circuit (or event generation circuit) 100) is described in detail in the technical teaching of U.S. Pat. No. 7,728,269 B2, which features may also be employed in the context of the present invention.

Further, generally, each cell 10 comprises an additional brightness readout circuit 300 being adapted to determine the magnitude of the photocurrent I at a given point in time t, t', t'', . . . or to derive from said photocurrent I another signal (particularly by integration or conversion) that also represents a measure for the (absolute) brightness at the respective cell 10.

Figure 2:
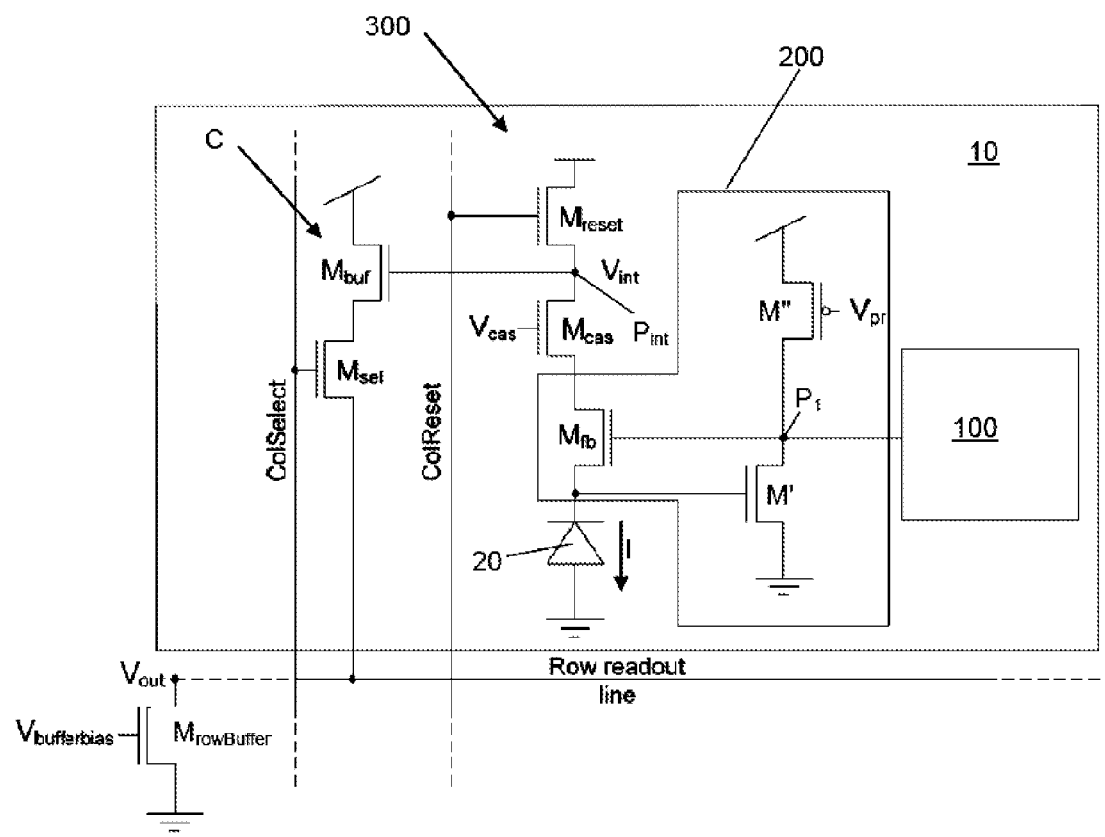
FIG. 2 shows an implementation of a magnitude readout using an integrating pixel circuit.

As shown in FIG. 1, the brightness readout circuit 300 is connected to the drain D of feedback transistor $M_{buf}$, i.e., directly driven by the photocurrent I of the respective cell 10. Thus, each single photodiode 20 of a respective cell 10 is of dual use, i.e., is used for sensing asynchronous change events, where the intensity changes by said threshold amounts T, T' as well as for sensing (determining) the magnitude of the photocurrent I which allows to determine the brightness at the respective cell 10. FIG. 2 shows an embodiment where said brightness is determined by integrating the photocurrent on a capacitance.

The brightness readout circuit 300 therefore comprises according to FIG. 2 a transistor $M_{cas}$ having a source that is connected to the drain of feedback transistor $M_{fb}$, a gate to which a voltage $V_{cas}$ is applied, and a drain that is connected via node $P_{int}$ to the source of a transistor $M_{reset}$ comprising a gate that is connected to the ColReset line, via which a ColReset signal can be applied to said gate of $M_{reset}$. Said node $P_{int}$ is further connected to the gate of a transistor $M_{buf}$ having a source that is connected to the drain of a transistor $M_{sel}$ whose gate is connected to a ColSelect line via which the cells 10 of a column can be selected for reading out the respective brightness, and whose source is connected to a row readout line to which a transistor $M_{rowBuffer}$ is connected via its drain while its source is connected to the ground. Further, a voltage $V_{bufferbias}$ is applied to the gate of a transistor $M_{rowBuffer}$. The output voltage $V_{out}$ (cf. also FIG. 3) is present at the drain of transistor $M_{rowBuffer}$.

In detail, the photocurrent I is integrated in the brightness readout circuit 300 on the parasitic gate capacitance C of transistor $M_{buf}$ after this voltage $V_{int}$ has been reset to a global reset level $V_{ResetLevel}$ by means of transistor $M_{reset}$. The voltage $V_{int}$ is then read after a fixed amount of time $T_{int}$. Thus, the voltage $V_{int}$ is $V_{ResetLevel}-I*T_{int}/C$.

Figure 3:
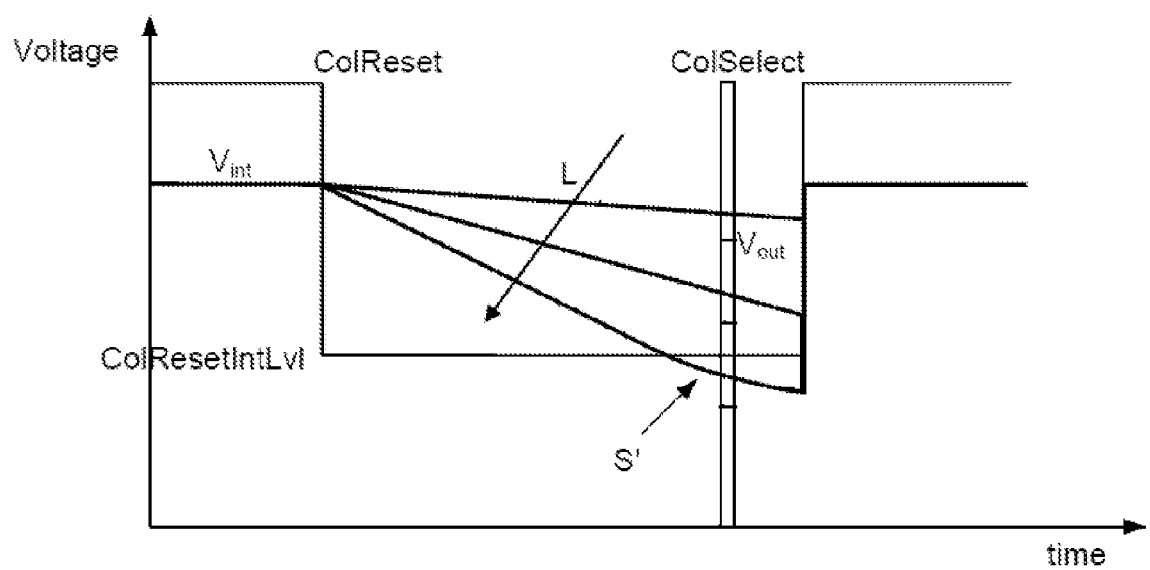
FIG. 3 shows typical signals of the embodiment shown in FIG. 2.

During integration, the ColReset signal for resetting the respective voltage $V_{int}$ is held at a voltage $V_{ColResetIntLvl}$ which is not ground as in conventional active pixel sensor pixels. Thus, transistor $M_{reset}$ limits the maximal voltage swing at the integration node $P_{int}$ ($V_{int}$) to avoid interfering with the event generation (change detection) circuit 100. An additional benefit of this is a softer shoulder S' for clipped highlights for pixels (cells) 10 that saturate as shown in FIG. 3. Subject to the limitation that $V_{int}$ does not drop too low so that it interferes with the change detection circuit (DVS Event generation circuit) 100 in particular, "stepped reset" schemes such as those disclosed in (S. Decker, D. McGrath, K. Brehmer, and C. Sodini, "A 256×256 CMOS imaging array with wide dynamic range pixels and column-parallel digital output," IEEE J. Solid-State Circuits, vol. 33, no. 12, pp. 2081-2091, December 1998) can be used to extend the dynamic range. The source-follower formed by the row parallel current source transistor $M_{rowBuffer}$ and transistor $M_{buf}$ buffers the voltage $V_{int}$ when this column is selected for readout by means of transistor $M_{sel}$.

FIG. 3 shows typical signals in this embodiment. The arrow L indicates how the shape of the signal $V_{int}$ changes towards higher intensities L.

Conventional double sampling techniques can be employed to reduce the effect of pixel-to-pixel variation, where a sample is taken during reset and then after integration and the output is the difference between the two samples. Transistor $M_{cas}$ is used to shield the drain of $M_{fb}$ from voltage transients which occur when $V_{int}$ is reset to $V_{resetLevel}$. This is important to avoid coupling from the brightness readout circuit 300 through the photosensor 200 to the event generation circuit (change detection circuit) 100.

Figure 4:
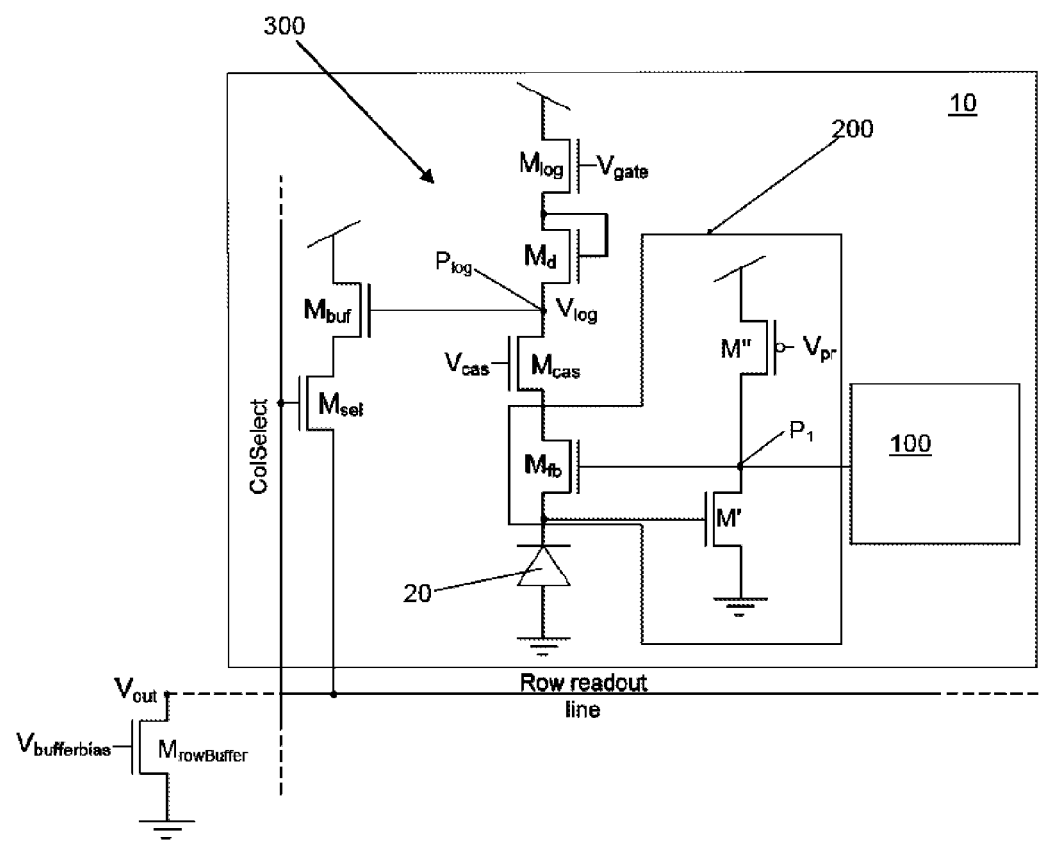
FIG. 4 shows an implementation of a logarithmic intensity to voltage conversion.

FIG. 4 shows a further embodiment where the photocurrent I is converted logarithmically to a voltage. For this, the brightness readout circuit 300 comprises a transistor $M_{cas}$ having a source that is connected to the drain of feedback transistor $M_{fb}$, a gate to which a voltage $V_{cas}$ is applied, and a drain that is connected via node $P_{log}$ ($V_{log}$) to the source of a transistor $M_d$ comprising a gate that is connected to the drain of transistor $M_d$, wherein said drain of transistor $M_d$ is further connected to a source of a transistor $M_{log}$ having a gate to which a voltage $V_{gate}$ is applied. Node $P_{log}$ is further connected to a gate of a transistor $M_{buf}$ having a source that is connected to the drain of a transistor $M_{sel}$ whose gate is connected to a ColSelect line and whose source is connected to a row readout line, to which a transistor $M_{rowBuffer}$ is connected via its drain while its source is connected to the ground. Further, a voltage $V_{bufferbias}$ is applied to the gate of $M_{rowBuffer}$. The output voltage $V_{out}$ (cf. also FIG. 3) is present at the drain of transistor $M_{rowBuffer}$.

In detail, the photocurrent I is converted logarithmically to a voltage $V_{log}$ by transistor $M_{log}$ running in the subthreshold regime. Transistor $M_d$ is optional and increases the signal swing. $M_{buf}$, $M_{sel}$ and $M_{cas}$ serve the same purposes as described with respect to FIG. 2. The embodiment shown in FIG. 4 allows sampling the brightness at any instant because the circuit continuously converts the photocurrent into a voltage. Offset correction schemes as proposed by (S. Kavadias, B. Dierickx, D. Scheffer, A. Alaerts, D. Uwaerts, and J. Bogaerts, "A logarithmic response CMOS image sensor with on-chip calibration," IEEE J. Solid-State Circuits, vol. 35, no. 8, pp. 1146-1152, August 2000) or (B. Choubey, S. Aoyoma, S. Otim, D. Joseph, and S. Collins, "An electronic calibration scheme for logarithmic CMOS pixels," IEEE Sensors J., vol. 6, no. 4, pp. 950-956, August 2006.) can be used to reduce the effect of pixel-to-pixel variation.

FIG. 5 illustrates the concept of extrapolation of the brightness data using the change events 30 detected by the change detection circuit 100. The actual brightness B indicates the amount of light falling on the corresponding cell (pixel) 10 of the photoarray 1. The brightness samples B' are taken at a regular interval R, namely at times t, t', t", . . . If a temporal contrast (change) event 30 is registered that corresponds to an increase in brightness or to a decrease in brightness, the current brightness estimate B" is updated according to the current threshold setting T, T'.

Errors in the extrapolation due to drift or noisy thresholds can be corrected as soon as a new brightness sample B' arrives, as indicated by the arrow C'. Generally, subsequent brightness samples B' and the number of temporal contrast (change) events 30 in-between these samples (at times t, t', t", . . . ) can also be used to compute accurately the event-thresholds T, T' of the corresponding pixels (cells) 10. The photoarray 1 can be configured to determine these event-thresholds accordingly.

FIG. 6 illustrates how the respective cell 10 (DVS pixel) is modified to enable the more accurate extrapolation of the actual brightness B. According thereto, transistor $M_{ros}$ is used to reset the event generation (i.e., the change detection circuit 100) whenever the pixel (cell) 10 is addressed via ColSelect to read the current brightness B'. ColSelect controls a transistor $M_{sel}$, which connects the brightness signal $V_{int}$ to row readout line $V_{out}$ via the source follower formed by transistor $M_{buf}$ and transistor $M_{RowBuffer}$. The row buffer transistor $M_{rowBuffer}$ is controlled by bias voltage $V_{bufferb}$ to act as a current sink for the pixel source follower. When the pixel (cell) 10 is selected via ColSelect, the transistor $M_{ros}$ is turned on, pulling nPixReset to ground. This action is the same as when the pixel change event is acknowledged via the AckColumn and ackRow signals. Thus, the reading of the brightness signal $V_{int}$ resets the change detection circuit 100 in the same way as when a change event 30 is transmitted. As in FIG. 2, the signal ColReset resets the brightness signal $V_{int}$ to a high voltage. The cells 10 can be arranged in a one- or two-dimensional array. A single cell 10 can be selected with shift register scanners or address decoders.

While there are shown and described presently preferred embodiments of the invention, it is to be distinctly understood that the invention is not limited thereto but may be otherwise variously embodied and practiced within the scope of the following claims.

The invention claimed is:

1. A photoarray, comprising:
a plurality of cells (10), wherein
each of said cells (10) comprises a means (20) that is configured to generate a photocurrent (I) being proportional to the intensity (L) of the light impinging on the respective cell (10), and wherein
each of said cells (10) comprises a change detection circuit (100) connected to the respective means (20) for generating the photocurrent (I), which change detection circuit (100) is configured to generate an output signal merely in case a change event (30) occurs at which said intensity (L) changes by a threshold amount (T, T') since the preceding change event (30) from the respective cell (10), wherein
the photoarray (1) is additionally also configured to determine the brightness (B') at the respective cell (10) by means of said means (20) for generating said photocurrent (I), and wherein
each cell (10) comprises a brightness readout circuit (300) that is configured so as to allow for reading a signal (Vout) representing the brightness (B) at the respective cell (10), wherein each cell (10) of the photoarray (1) is configured to drive the brightness readout circuit (300) directly by means of the photocurrent (I), wherein the photocurrent directly drives the brightness readout circuit, rather than being first copied.

2. The photoarray as claimed in claim 1, characterized in that each cell (10) is configured to determine said brightness (B') at a constant rate and to update said brightness (B') at detected change events (30).

3. The photoarray as claimed in claim 1, characterized in that said means (20) for generating the photocurrent (I) is formed by a photodiode or a phototransistor, particularly by a single photodiode or phototransistor.

4. The photoarray as claimed in claim 1, characterized in that said change detection (100) circuit is configured to generate an output signal if and only if a change event (30) occurs at which said intensity (L) changes by a threshold amount (T, T') since the preceding change event (30) from the respective cell (10), wherein said output signal is an ON-Signal when said intensity (L) increases by a threshold amount (T) and an OFF-signal when said intensity (L) decreases by a threshold amount (T').

5. The photoarray as claimed in claim 1, characterized in that the magnitude of the photocurrent (I) of the respective cell (10) or a quantity derived therefrom is used as a measure for the brightness (B) at the respective cell (10).

6. The photoarray as claimed in claim 1, characterized in that the photoarray (1) is configured to reset the change detection circuit (100) whenever the current brightness (B') is read out for the corresponding cell (10).

7. The photoarray as claimed in claim 1, characterized in that the brightness readout (300) circuit is configured to represent the current magnitude of the photocurrent (I) of the respective cell (10) being a measure for the brightness (B') at the respective cell (10) as an analog voltage.

8. The photoarray as claimed in claim 1, characterized in that the photoarray (1) comprises a topological one- or two-dimensional array of cells (10).

9. The photoarray as claimed in claim 1, characterized in that the cells (10) each comprise an outer boundary delimiting the respective cell (10), wherein said outer boundary particularly comprises a rectangular shape.

10. The photoarray as claimed in claim 5, characterized in that the brightness readout circuit (300) is connected to the drain (D) of a transistor ($M_{fb}$), wherein the source (S) of said transistor ($M_{fb}$) is connected to said means (20) for generating the photocurrent (I), particularly to the n-region of a single photodiode (20).

11. The photoarray as claimed in claim 5, characterized in that the photoarray (1) is adapted to determine the current brightness (B') at the respective cell (10) at successive points in time (t, t', t") with a constant or variable rate, wherein particularly said rate is at least temporarily smaller than an average rate of the change events (30).

12. The photoarray as claimed in claim 11, characterized in that the photoarray (1) is configured to estimate the brightness (B") at the respective cell (10) between two of said successive points in time (t, t') by updating the brightness (B') sampled at the last point in time (t) at each change event (30) according to the current threshold amount (T, T') associated with the respective change event (30).

13. The photoarray as claimed in claim 5, characterized in that the photoarray (1) is configured such that the change detection circuit (100) functions completely independently from the brightness readout circuit (300).

14. The photoarray as claimed in claim 5, characterized in that the brightness readout circuit (300) is configured to integrate the photocurrent (I) of the respective cell (10) on a capacitance (C) in order to determine the brightness (B') at the respective cell (10).

15. The photoarray as claimed in 5, characterized in that the brightness readout circuit (300) is configured to logarithmically convert the photocurrent (I) of the respective cell (10) into a voltage using at least one transistor ($M_{log}$) working particularly in a subthreshold regime in order to determine the brightness (B') at the respective cell (10).

16. The photoarray as claimed in claim 5, characterized in that the brightness readout circuit (300) is configured to integrate the photocurrent (I) of the respective cell (10) on a capacitance over a fixed voltage range in order to determine the brightness (B') at the respective cell (10), wherein particularly the brightness information is then contained in a time between a start and an end of the integration over said voltage range.

17. A photoarray, comprising:

a plurality of cells (10), wherein each of said cells (10) comprises a means (20) that is configured to generate a photocurrent (I) being proportional to the intensity (L) of the light impinging on the respective cell (10), and wherein each of said cells (10) comprises a change detection circuit (100) connected to the respective means (20) for generating the photocurrent (I), which change detection circuit (100) is configured to generate an output signal merely in case a change event (30) occurs at which said intensity (L) changes by a threshold amount (T, T') since the preceding change event (30) from the respective cell (10), wherein the photoarray (1) is additionally also configured to determine the brightness (B') at the respective cell (10) by means of said means (20) for generating said photocurrent (I), and wherein said change detection (100) circuit is configured to generate an output signal if and only if a change event (30) occurs at which said intensity (L) changes by a threshold amount (T, T') since the preceding change event (30) from the respective cell (10), wherein said output signal is an ON-Signal when said intensity (L) increases by a threshold amount (T) and an OFF-signal when said intensity (L) decreases by a threshold amount (T').

\* \* \* \* \*